Figure 1:
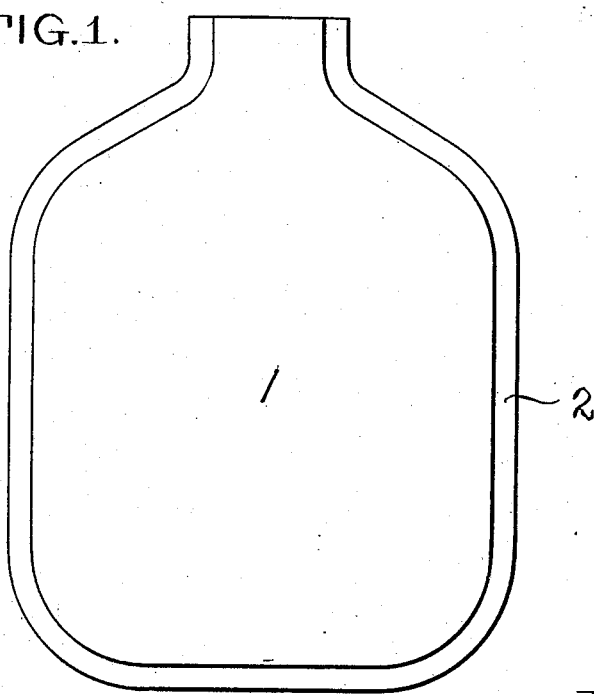

No. 889,376. PATENTED JUNE 2, 1908.
I. F. KEPLER.
HOLLOW RUBBER ARTICLE HAVING SEAMS.
APPLICATION FILED AUG. 4, 1905.

WITNESSES:
Oliver Williams
Frederick A. Blount

INVENTOR
Irwin Floyd Kepler
BY
Edward Davis
ATTORNEY

UNITED STATES PATENT OFFICE.

IRWIN FLOYD KEPLER, OF AKRON, OHIO, ASSIGNOR TO THE B. F. GOODRICH COMPANY, OF AKRON, OHIO, A CORPORATION OF OHIO.

HOLLOW RUBBER ARTICLE HAVING SEAMS.

No. 889,376.  Specification of Letters Patent.  Patented June 2, 1908.

Application filed August 4, 1905. Serial No. 272,727.

*To all whom it may concern:*

Be it known that I, IRWIN FLOYD KEPLER, a citizen of the United States of America, and a resident of the city of Akron, county of Summit, and State of Ohio, have invented certain new and useful Improvements in Hollow Rubber Articles Having Seams, of which the following is a specification.

My invention relates to seams, or joined edges, used in the manufacture of bag-bodies from uncured rubber sheets, particularly bag-bodies of the class employed as hot-water bags, syringes, atomizers, and analogous articles of rubber for containing gases or fluids.

It has for its object the production of a seam which, under conditions of temperature or pressure normally met with in use of the articles to which it is adapted, will not open by splitting, cracking, tearing or pulling apart, but will have as long a life as the remainder of the structure. I attain these objects by a process of manufacture forming the subject matter of my Patent No. 868,668 dated October 22nd, 1907.

My improved seam consists in forming an edge-joint having a double thickness at the point of union between the joined walls. In bag-bodies as commonly formed from sheets of uncured rubber, the side walls are cut of equal size, and, being superposed, the edges are united. The union between the edges of these sheets is imperfect, as they cannot be caused to adhere as closely as the material of the side walls, and to reinforce such edge-joint stay-strips are interposed between the edges or bound around them, and incorporated so far as possible by pressure and vulcanization.

In my improved seam, I secure strength of seam without reinforcing it equal to that of the seam to which a stay-strip has been added. I attain this result by cutting the side walls of unequal area, so that one overlaps the other marginally, and may be overturned about it. By this construction a considerable area of contact between the sheet rubber comprising the side walls is secured, without loss of capacity in the article, or increasing its size. This increased contact area promotes adhesion and causes strains to be distributed, so that the seam does not tend to split or tear open. If desired, stay-strips in the usual manner may also be used to reinforce this seam, in cases where the article is to be subjected to unusual pressure or temperatures, but for common use, they are superfluous. This important result follows from the fact that the edge of the bag-body is able to resist strain or wear because the fold is not at the joint of union of the two sides as in ordinary bags, but is formed by a homogeneous portion of the side itself at some distance from its edge. Moreover, the edge of the side at that point is on the inside of the bag, the outside edge of the overlap being at some distance from the fold.

Figure 2:
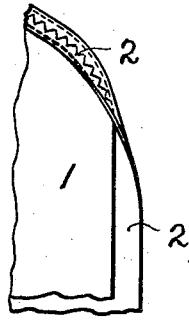
Figure 3:
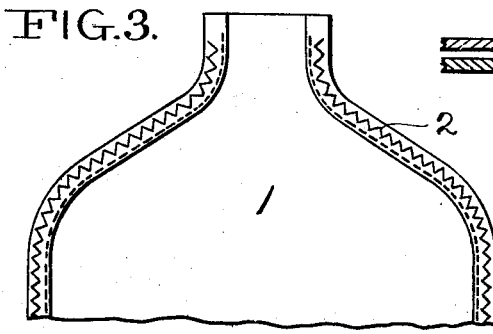
Figure 4:
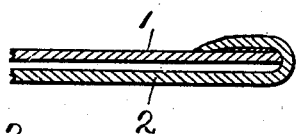
Figure 5:
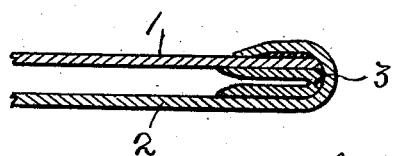
Figure 6:
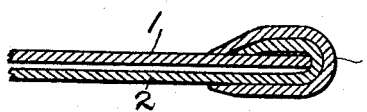

In the drawings Figure 1 shows the two sides or walls of the bag, one superposed on the other. Fig. 2 illustrates the formation of the edge-joint. Fig. 3 is a view of a portion of the bag showing the completed joint. Fig. 4 is a cross-section through the edge-joint showing its structure. Figs. 5 and 6 are cross-sections of the edge joint of the bag-body illustrating two forms of reinforcing, which may be used.

The two sides or walls 1 and 2 of the bag-body are cut from unvulcanized sheet rubber, preferably by the use of a matrix die-press, which at the same time may impress upon the rubber any desired ornamentation. One side is made of similar form but of slightly greater area than the other. The smaller side 1 is then centrally superposed upon the larger 2, as shown in Fig. 1, the contacting surfaces being first dusted with any suitable powder to prevent union under the heat of vulcanization. The projecting margin of the larger side is then coated with any suitable adhesive material and folded over the edge of the smaller side, pressure being applied to cement the parts firmly together. The funnel, screw-neck, straps or any desired trimmings are then attached and the whole is vulcanized in the usual manner. If desired this edge-joint may be reinforced either by inserting a folded strip of rubber 3 between the edges before turning down the projecting margin, or by applying to the outside of the joint a binding 4 of thin sheet rubber as is usually done at present. In practice however I find it entirely unnecessary to reënforce this joint as it is practically as strong and durable as any other portion of the bag-body.

Having described my invention, what I claim is:

1. A rubber bag body composed of two parts of similar outline, one of which is larger than the other, the larger side being folded over to form the edge of the bag, said folded over part and the marginal portion of the smaller side being superimposed and vulcanized together.

2. A rubber bag body composed of two parts of similar outline, one of which is larger than the other, the larger side being folded over to form the edge of the bag, said folded over part being of the same thickness as the side, said folded over part and the marginal portion of the smaller side being superimposed and vulcanized together to bring the seam inside of the outline of the bag edge, and out of the area of maximum bending.

3. A rubber bag body composed of two parts of similar outline, one of which is larger than the other, the larger side being folded over to form the edge of the bag; said folded over part and the marginal portion of the smaller side being superimposed and vulcanized together, and a longitudinally folded reinforcing strip vulcanized to the two bag sides along the inside of the edge.

IRWIN FLOYD KEPLER.

Witnesses:
WILLIAM A. MEANS,
A. E. ROACH.